United States Patent
Kim et al.

(10) Patent No.: US 8,366,553 B2
(45) Date of Patent: Feb. 5, 2013

(54) METHOD AND SYSTEM FOR DETECTING BOT SCUM IN MASSIVE MULTIPLAYER ONLINE ROLE PLAYING GAME

(75) Inventors: Chong Kwon Kim, Seoul (KR); Hilaire Sylvain, Seoul (KR)

(73) Assignee: SNU R&DB Foundation, Seoul (KR)

( * ) Notice: Subject to any disclaimer, the term of this patent is extended or adjusted under 35 U.S.C. 154(b) by 235 days.

(21) Appl. No.: 12/789,917

(22) Filed: May 28, 2010

(65) Prior Publication Data

US 2011/0256932 A1    Oct. 20, 2011

(30) Foreign Application Priority Data

Apr. 19, 2010  (KR) .................. 10-2010-0036045

(51) Int. Cl.
*G06F 17/00*    (2006.01)
(52) U.S. Cl. .......................................... 463/42; 463/29
(58) Field of Classification Search .................. 463/42, 463/29
See application file for complete search history.

(56) References Cited

U.S. PATENT DOCUMENTS 7,836,009 B2 * 11/2010 Paczkowski et al. .............. 1/1
7,945,952 B1 *  5/2011 Behforooz ..................... 726/22

FOREIGN PATENT DOCUMENTS

KR    1020040082633 A    9/2004
KR    10-2008-0021492 A    3/2008

OTHER PUBLICATIONS

Gu, "Correlation-Based Botnet Detection in Enterprise Networks", Georgia Institute of Technology, Aug. 2008.*
Schluessier et al., "Is a Bot at the Controls? Detecting Input Data Attacks", Netgames, Sep. 2007.*
Hye-Wuk Jung et al., "Game Behavior Pattern Modeling for Bots (Auto Program) Detection", Oct. 2009, pp. 53-61, vol. 9, No. 5.
Kuan-Ta Chen et al. "Identifying MMORPG Bots: A Traffic Analysis Approach", EURASIP Journal on Advances in Signal Processing, vol. 2009.
Luis Von Ahn et al. "CAPTCHA: Using Hard AI Problems for Security", Proceedings of Eurocrypt, 2003.

* cited by examiner

*Primary Examiner* — Michael Cuff

(57) ABSTRACT

Provided are a method and system for detecting a bot in a Massive Multiplayer Online Role Playing Game (MMORPG) online and in real time. By analyzing a communication pattern between a client and a server, the bot is detected based on parameters such as data length, inter-arrival time and data length auto correlation. Tests using respective parameters are combined to construct a global decision scheme, and thus more accurate detection results can be obtained. An integrated anti-bot defense system can be built by combining other tests such as a Turing test.

4 Claims, 7 Drawing Sheets

METHOD AND SYSTEM FOR DETECTING BOT SCUM IN MASSIVE MULTIPLAYER ONLINE ROLE PLAYING GAME

CROSS-REFERENCE TO RELATED APPLICATIONS

This application claims priority under 35 U.S.C. §119 to Korean Patent Application No. 10-2010-0036045, filed on Apr. 19, 2010, the disclosure of which is incorporated herein by reference in its entirety.

TECHNICAL FIELD

The following disclosure relates to a method and system for detecting bot scum in a Massive Multiplayer Online Role Playing Game (MMORPG), and in particular, to a method and system for detecting bot scum in an MMORPG online and in real time.

BACKGROUND

Recently, bots or bot scum are becoming an increasingly important issue in a field of online game. Bots are software applications that run automated tasks instead of a user in an online game. The bots give unfair advantages to users using them, and are considered as cheating. Accordingly, from the perspective of a game server, bots are not desired. Use of bot results in huge game imbalances and is very bothersome for honest game players who want to play the game fairly. Players are thus discouraged from keeping paying subscription fees for online game, which naturally threatens game providers' profits.

To fight this scourge, game providers must react quickly to bots' evolution so as to limit their spread while avoiding wrongly accusing human players of cheating of bots. Many strategies have been suggested for anti-bot defense.

Game providers often use repeated Turing tests including CAPTCHA (Completely Automated Public Turing tests tell Computers and Humans Apart) and human controls, which exhibit very accurate decision and reasonable deployment requirements. However, in response to the Turing test, a bot capable of calling an actual user has been developed.

There is another common method of installing software on client machines to prevent bot use, but it is helpless against well-designed bots.

On the other hand, academic researchers are interested in understanding characteristics of specific acts of bots and human beings. These scientific approaches bring forth a method for automatically detecting a bot. Each approach focuses on some theoretical understanding or specific rationale, rather than comprehensive real-time defense strategies. Also, because of lack of complexity and scalability, it is difficult that the above approaches are adapted to actual systems. For example, though a traffic analysis approach provides low time complexity and good results, it cannot be performed online. An I/O device event sequence analysis approach has strong performance, but is impractical.

SUMMARY

Accordingly, the present disclosure provides a method for detecting a bot in a Massive Multiplayer Online Role Playing Game (MMORPG) system online.

The present disclosure also provides a low cost and real-time method for detecting a bot through simple calculation.

In one general aspect, a method for detecting a bot an MMORPG in includes: calculating an auto correlation value on consecutive jumping windows of a user; comparing the auto correlation value with a first threshold to increase bot's vote by 1 when the auto correlation value is less than the first threshold; and determining the user as a bot when the number of bot's vote is more than a second threshold.

Here, the second threshold may be a half of all votes.

In another general aspect, a method for detecting a bot in an MMORPG includes: counting the number of packets having an inter-arrival time over a first threshold (itthr1) among consecutive packets inputted from a user within a window having a predetermined size; counting the number of packets having the inter-arrival time over a second threshold (itthr2) among the consecutive packets; and determining the user as a bot when the number of packets having the inter-arrival time over the first threshold (itthr1) is less than a third threshold (itrt1), or a ratio of the number of packets having the inter-arrival time over the second threshold (itthr2) and the number of packets having the inter-arrival time over the first threshold (itthr1) is more than a fourth threshold (itrt2).

In another general aspect, a method for detecting a bot in an MMORPG includes: counting the number of packets having a data length over a first threshold (dlthr1) among consecutive packets inputted from a user within a window having a predetermined size; counting the number of packets having the data length over a second threshold (dlthr2) among the consecutive packets; and determining the user as a bot when the number of packets having the data length over the first threshold (dlthr1) is less than a third threshold (dlrt1), and the number of packets having the data length over the second threshold (dlthr2) is less than a fourth threshold(dlrt2).

In another general aspect, a method for detecting a bot in an MMORPG includes: (a-1) calculating an auto correlation value on consecutive jumping windows of a user; (a-2) comparing the auto correlation value with a first threshold to increase bot's vote by 1 when the auto correlation value is less than the first threshold; (a-3) determining the user as a bot when the number of bot's vote is more than more than a second threshold; (b-1) counting the number of packets having an inter-arrival time over a third threshold (itthr1) among consecutive packets inputted from a user within a window having a first predetermined size, when the number of bot's vote is less than the second threshold; (b-2) counting the number of packets having the inter-arrival time over a fourth threshold (itthr2) among the consecutive packets; (b-3) determining the user as a human being when the number of packets having the inter-arrival time over the third threshold (itthr1) is more than a fifth threshold (itrt1), or a ratio of the number of packets having the inter-arrival time over the fourth threshold (itthr2) and the number of packets having the inter-arrival time over the third threshold (itthr1) is less than a sixth threshold (itrt2); (c-1) counting the number of packets having a data length over a seventh threshold (dlthr1) among consecutive packets inputted from a user within a window having a second predetermined size, when the number of packets having the inter-arrival time over the third threshold (itthr1) is less than the fifth threshold (itrt1), or a ratio of the number of packets having the inter-arrival time over the fourth threshold (itthr2) and the number of packets having the inter-arrival time over the third threshold (itthr1) is more than the sixth threshold (itrt2); (c-2) counting the number of packets having the data length over a eighth threshold (dlthr2) among the consecutive packets; (c-3) determining the user as the bot when the number of packets having the data length over the seventh threshold (dlthr1) is less than a ninth threshold (dlrt1), and the number of packets having the data length over the eighth threshold (dlthr2) is less than a tenth threshold (dlrt2); and (c-4) determining the user as the human being when the number of packets having the data length over the seventh threshold (dlthr1) is more than the ninth threshold (dlrt1), or the number of packets having the data length over the eighth threshold (dlthr2) is more than the tenth threshold (dlrt2).

In another general aspect, a system for detecting a bot in an MMORPG includes: an online bot detection unit detecting a bot based on above described method; a Turing test unit performing a Turing test; a combination unit combining a result of the online bot detection unit with a result of the Turing test unit; and an event generating unit generating a control event in response to an output of the combination unit.

Other features and aspects will be apparent from the following detailed description, the drawings, and the claims.

DETAILED DESCRIPTION OF EMBODIMENTS

Figure 1A:
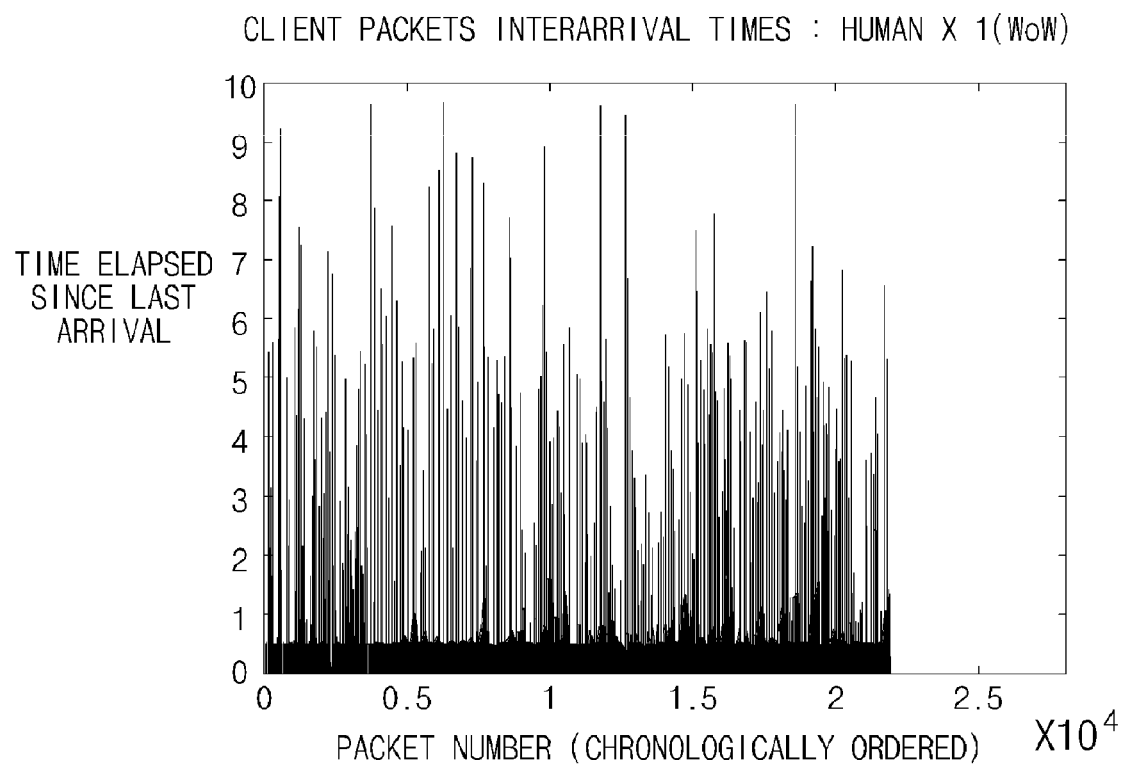
FIGS. 1A and 1B are diagrams illustrating inter-arrival times of chronologically ordered packets within one trace in cases of bot and human being.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

According to an exemplary embodiment, a real-time detection method for ground layer character pre-selection in response to a traffic pattern of bot. Thus, the bot may be detected only by short traces samples and simple calculation. Further, a scheme for an anti-bot defense system can be provided, using the real-time detection method.

In a field related to bots, anti-bots countermeasure is as important as bot detection. While many good schemes have been proposed to detect the bot, almost nothing is dealing with some really dissuasive punishment policy. Nowadays, temporary and definitive ban are the available solutions but are somehow irreversible, making multiple checks and parsimony necessary to avoid catastrophic wrong sentences. Thus, countermeasures are still rarely used, encouraging bot users to have a try with limited risks.

Thus, in order to achieve an effective restriction to a bot, it requires a ground layer detection method that investigates exhaustively and on-the-fly every player's traces to yield a pre-selection of "good candidates".

According to an analysis of client-server communication pattern of bot and human being, it is found that the bots' case has distinctive patterns in regard to packet timing and size, which are different from the case of human being.

Hereinafter, in regard to inter-arrival time, data length, and data length autocorrelation, respectively, differences between the bot and the human activities are described.

1. Inter-Arrival Times

Figure 1B:
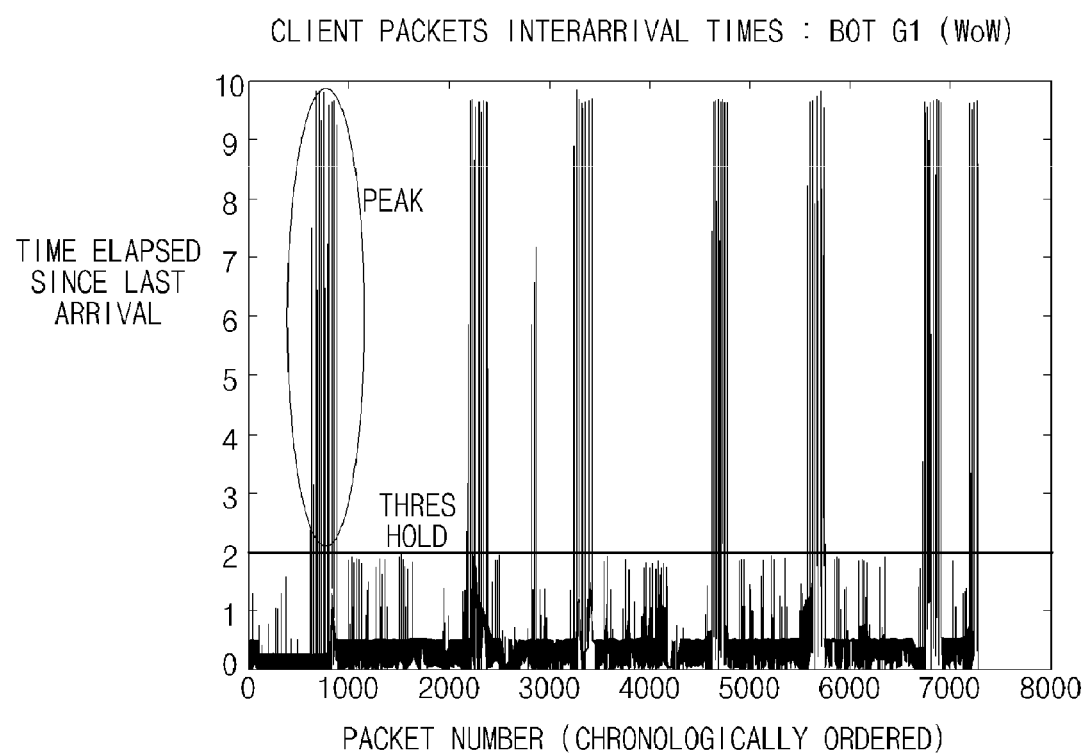
Figure 2A:
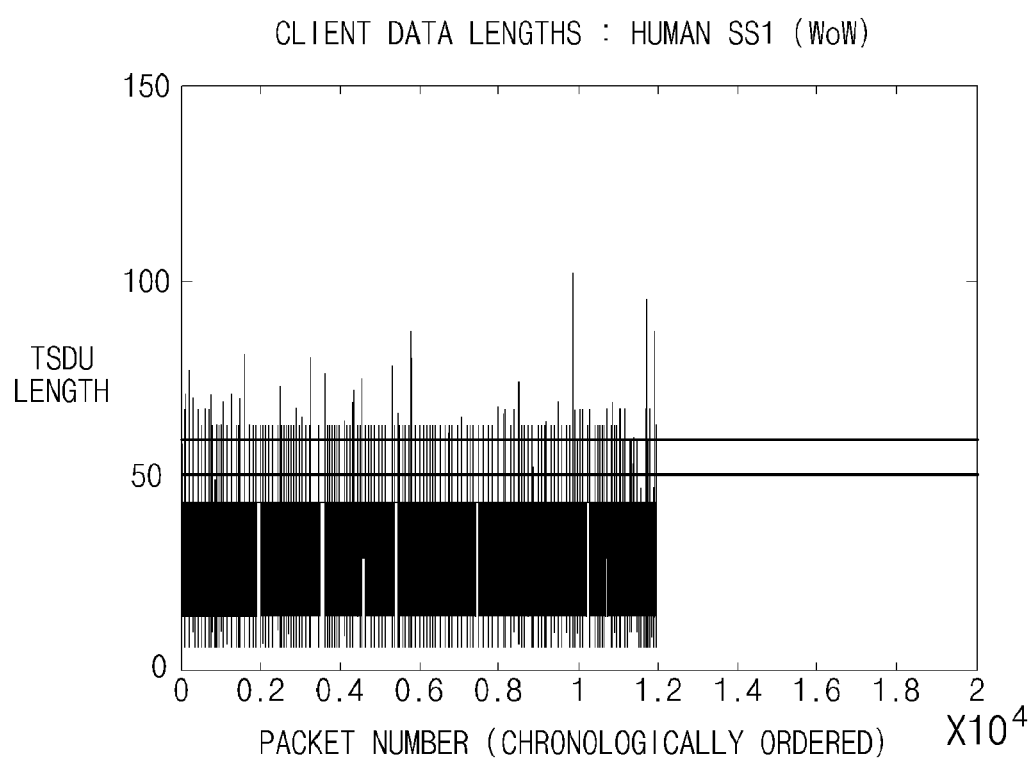
FIGS. 2A and 2B are diagrams illustrating data lengths of chronologically ordered packets within one trace in cases of bot and human being.
Figure 2B:
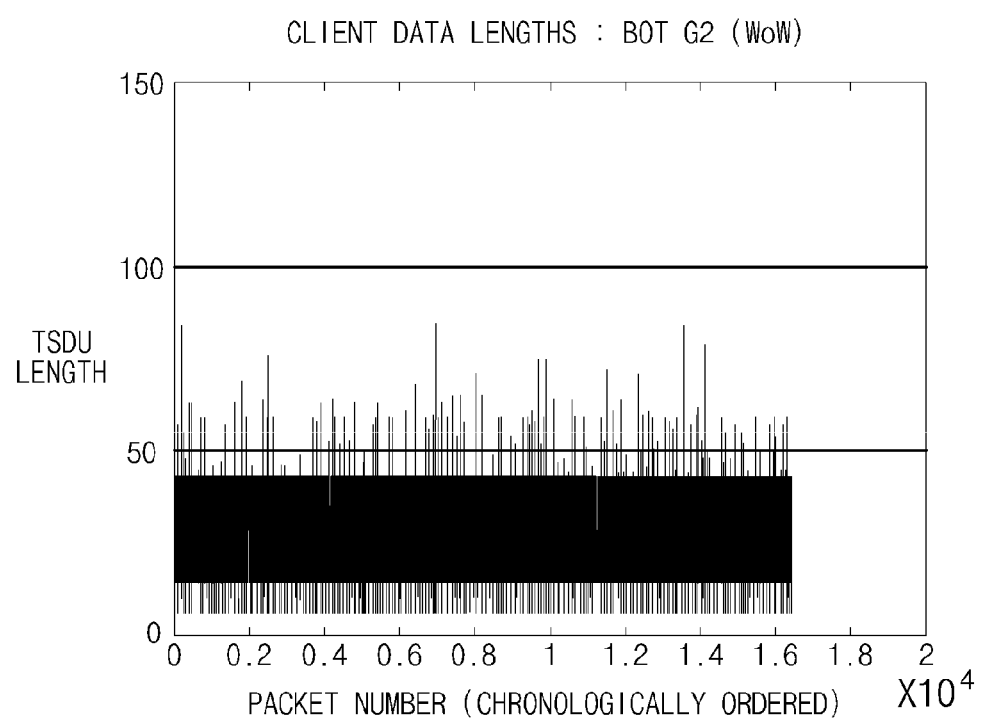

For each packet, inter-arrival time is the time duration elapsed since last packet arrival. FIGS. 1A and 1B illustrate inter-arrival times of chronologically ordered packets within one trace: FIG. 1A illustrates a case of human being, and FIG. 1B illustrates a case of bot. As shown in FIGS. 1A and 1B, while human has a random values distribution, on small sample of consecutive packets, bot shows either regular and fast packet arrivals pattern or high and sharp peaks resulting in periods of inactivity. Herein, the periods of inactivity is probably occurred due to path finding or character's death. Then, we will consider as bot trace a sample containing only low inter-arrival time values or a sharp peak 2. Data Lengths A data length of a packet means the size of the corresponding segment's payload, i.e., a length of Transport Service Data Unit (TSDU). FIGS. 2A and 2B illustrate data lengths of chronologically ordered packets within one trace: FIG. 2A illustrates a case of human being, and FIG. 2B illustrates a case of bot. As shown in FIGS. 2A and 2B, a bot sends almost no big packets having a value over a threshold, unlike human being. This could be used as a test's criterion. However, anti-bot defense system may have better performance by checking the data lengths distribution more accurately with a second threshold which described later.

3. Data Length Auto Correlation

Figure 3:
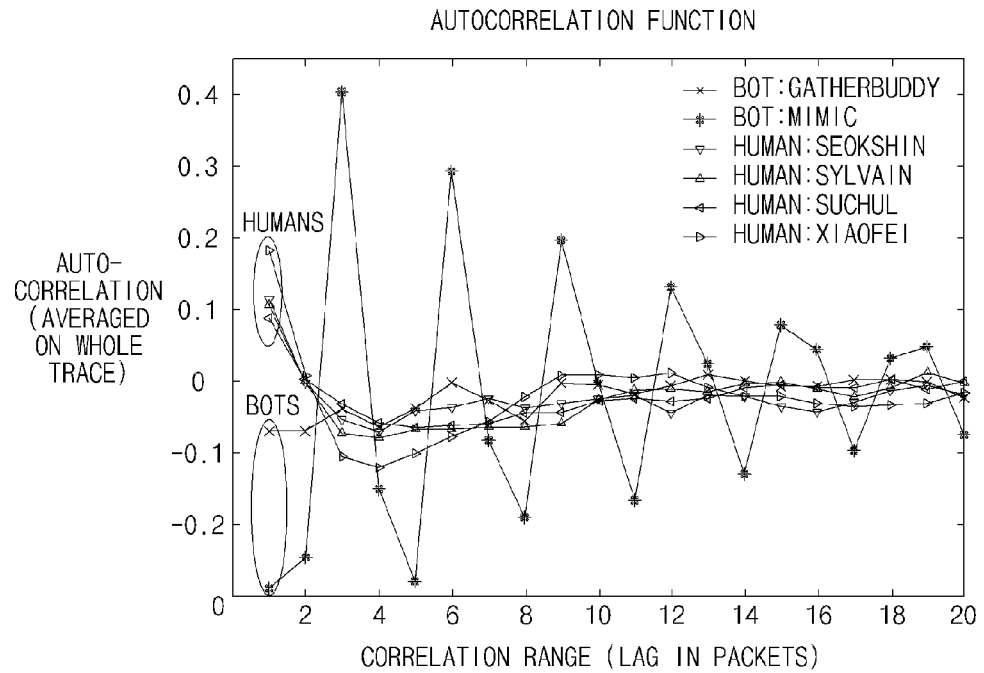
FIG. 3 is a graph illustrating auto correlation profiles for various traces.

In a given data stream, a packet size is auto-correlated. Human behavior is generally expected to be more random and unpredictable than bot's. As a result, data length autocorrelation is used for another decision test as a discriminative feature between bots and human beings. FIG. 3 is a graph illustrating auto correlation profiles for various traces. Human traces show that data length autocorrelation function is maintained within a uniformed range, which is significantly far from 0; but bot traces describe that data length auto correlation function has an oscillating shape. Accordingly, since there is shape difference of the data length auto correlation function between human being and bots, the difference can be used as a discriminative feature between bots and humans. Narrowing the scope on the first autocorrelation range, bots' data length autocorrelation is negative, while humans' one is positive. This may be considered as a threshold.

Hereinafter, a test designed for discriminating human beings and bots based on above described three valuables is depicted.

A. Data Length Auto Correlation Test

Figure 4:
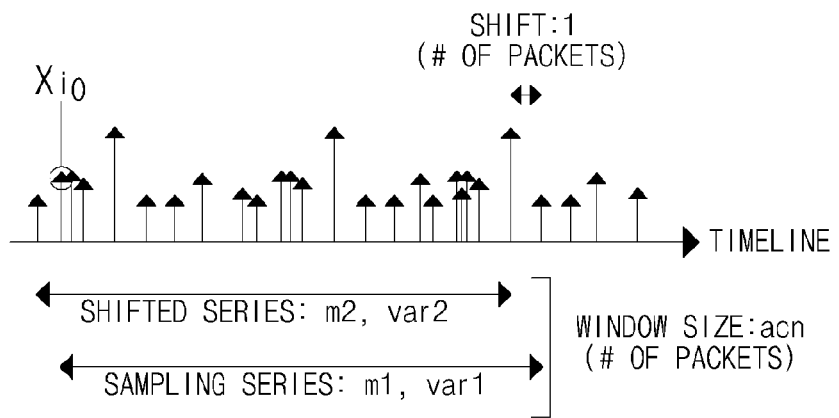
FIG. 4 is a diagram illustrating arrangements of each window for autocorrelation online calculation.

By using the standard definition of autocorrelation, it is possible to perform on-the-fly calculation on short jumping windows. FIG. 4 illustrates the arrangement of each window. Thus, autocorrelation is calculated using the sampling series (m1, var1) and its shifted counterpart (shifted series) (m2, var2). Herein, shift is 1. From this, autocorrelation is expressed as Equation (1) below.

$$\frac{m12 - m1m2}{sqrt((m11 - (m1)^2)(m22 - (m2)^2))} \quad (1)$$

Herein, m1=mean(X); m2=mean(Y); m11=mean($X^2$); m22=mean($Y^2$); m12=mean(XY), which variables are denoted respectively by X and Y.

Pseudo-code 1 describes the data length autocorrelation test. In detail, the Pseudo-code 1 calculates autocorrelation values on consecutive jumping windows, compares them with a decision threshold, and finally performs a majority vote among the consecutive decisions. Its input parameters are the sampling series size acn, the number of "voters" acv, and the decision threshold acthr.

---

[Pseudo-code 1: DATA LENGTH AUTOCORRELATION]

```
vote_counter; bot_vote ← 0
m1;m2;m11;m22;m12 ← 0
value_counter ← 0
while new packets arrive do
    x ← waitNewValue( ) {value stored at packet arrival}
    if value_counter ≧ 1 then
        m1 ← m1 + x, m11 ← m11 + x * x,
        m12 ← m12 + x * pv
    end if
    m2 ← m2 + x, m22 ← m22 + x * x,
    pv ← x, {storage of shifted value}
    value_counter ← value_counter + 1
    if value_counter= acn + 1 then
        m2 ← m2 - x, m2 ← m2 - x * x, {correction}
        m1 ← m1/n, m2 ← m2/n, m11 ← m11/n,
        m22 ← m22/n, m12 ← m12/n,
        d ← sqrt((m11 - (m1)²)(m22 - (m2)²)),
        aux ← (m12 - m1m2)/d
        if aux < acthre then
            bot_vote ← bot_vote + 1
        end if
        vote_counter ← vote_counter + 1
        if vote_counter = acv then
            if bot_vote > acv=2 then
                return BOT
            else
                return HUMAN
            end if
            vote_counter; bot_vote ← 0
            m1;m2;m11;m22;m12 ← 0
            value_counter ← 0
        end if
    end if
end while
```

---

B. Inter-Arrival Time Test

Figure 5:
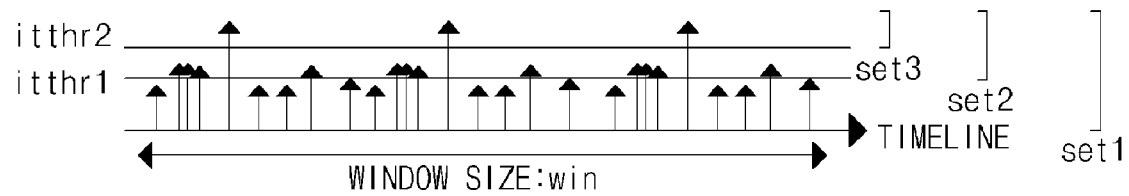
FIG. 5 is a diagram illustrating arrangements of each window for an inter-arrival time test between packets.

This test is twofold: counting, within a window having a length of 'win' parameter, the number of values above a threshold itthr1; and, among these values, calculating the ratio of values over a second threshold itthr2. According to FIG. 5, this is equivalent to derive this is equivalent to derive [set2] and [set3]/[set2]. The first test checks regularity; and the second test checks the presence of peak. After several possibilities are considered, checking the concentration of very high values out of the "regularity zone" is found as the most efficient technique. That is, if [set2] is strictly smaller than a threshold itrt1 and if [set3]/[set2] is strictly greater than another threshold itrt2, presence of peak is confirmed. If one of these properties is found for the sample window, the test returns BOT. The corresponding online algorithm is described in the following Pseudo-code 2.

---

[Pseudo-code 2: INTERARRIVAL TIMES]

```
index; set2_counter; set3_counter ← 0
while new packets arrive do
    x ← waitNewValue( ) {value stored at packet arrival}
    if x > itthr1 then
        set2_counter ← set2_counter + 1
    end if
    if x > itthr2 then
        set3_counter ← set3_counter + 1
    end if
    index ← index + 1
    if index = win then
        if set2_counter < itrt1 then
            return BOT
        else
            if (set3_counter/set2_counter) > itrt2 then
                return BOT
            else
                return HUMAN
            end if
        end if
        index; set2_counter; set3_counter ← 0
    end if
end while
```

---

C. Data Lengths Test

This test checks two properties of the sample window having a length of 'win' parameter: one checks that the number of values over a threshold dlthr1 is strictly smaller than a quantity dlrt1 (regularity); and the other checks that the number of values over another threshold dlthr2 is strictly smaller than another quantity dlrt2 (short length). If the sample window exhibits both regularity and short length properties, the test returns BOT. The corresponding online algorithm is described in the following Pseudo-code 3.

---

[Pseudo-code 3: DATA LENGTHS]

```
index; set2_counter; set3_counter ← 0
while new packets arrive do
    x ← waitNewValue( ) {value stored at packet arrival}
    if x > dlthr1 then
        set2_counter ← set2_counter + 1
    end if
    if x > dlthr2 then
        set3_counter ← set3_counter + 1
    end if
    index ← index + 1
    if index = win then
        if set2_counter < itrt1 then
            if set3_counter < itrt2 then
                return BOT
            else
                return HUMAN
            end if
        else
            return HUMAN
        end if
        index; set2_counter; set3_counter ← 0
    end if
end while
```

D. Global Decision Scheme

In global decision scheme, the notations introduced in the previous subsections are used. The global decision scheme's operation is quite simple: at each packet arrival, it updates each of the different tests until they all have got enough data to return a decision. For example, amounts of data having a length of 'win' parameter may have been collected. For synchronization, parameters controlling sample window's size is expressed as Equation (2) below.

$$win = acv(acn+1) \qquad (2)$$

Figure 6:
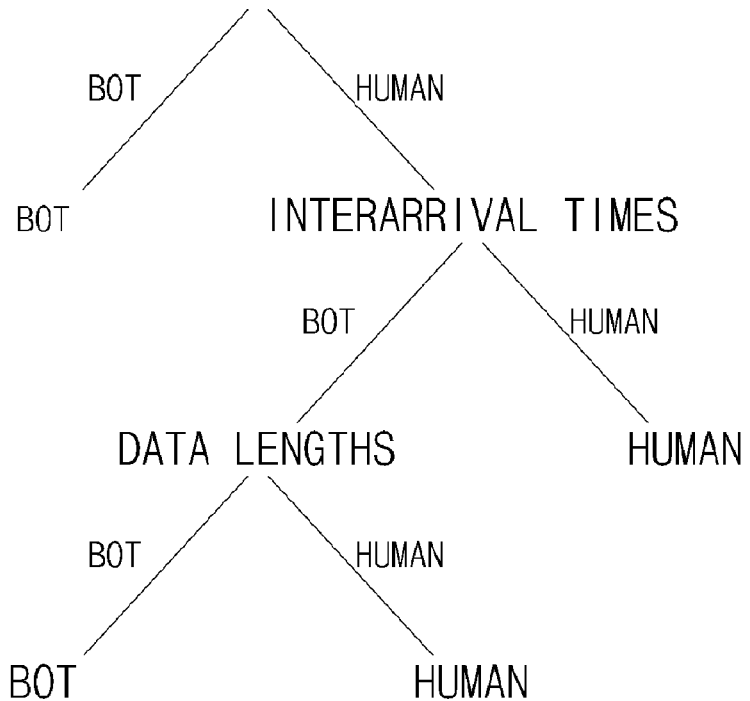
FIG. 6 is a diagram illustrating a method for a comprehensive bot determination according to an exemplary embodiment.

Once all previous tests returned their results, the global scheme uses the decision tree shown in FIG. 6 to classify the collected trace. It keeps returning real-time decisions while the player is connected to the game server. Its parameters are the sample window's size win (reused by INTERARRIVAL TIMES and DATA LENGTHS tests) as well as those introduced in previous subsections for each specific test. The corresponding online algorithm is described in the following Pseudo-code 4.

[Pseudo-code 4: Global decision scheme]

```
index ← 0
DATA LENGTHS AUTOCORRELATION ← reset( )
INTERARRIVAL TIMES ← reset( )
DATA LENGTHS ← reset( )
while new packets arrive do
    x ← waitNewValue( ) {value stored at packet arrival}
    DATA LENGTHS AUTOCORRELATION ← update(x)
    INTERARRIVAL TIMES ← update(x)
    DATA LENGTHS ← update(x)
    index ← index + 1
    if index = win then
        if DATA LENGTHS AUTOCORRELATION = BOT then
            return BOT
        else
            if INTERARRIVAL TIMES = HUMAN then
                return HUMAN
            else
                return DATA LENGTHS
            end if
        end if
        index ← 0
        DATA LENGTHS AUTOCORRELATION ← reset( )
        INTERARRIVAL TIMES ← reset( )
        DATA LENGTHS ← reset( )
    end if
end while
```

This method shows linear time complexity and constant space complexity according to sample window's size. In the Pseudo-code 4, the previously defined algorithms are called by the global decision scheme. The reset( ) instruction means that local variables are reset to their initial state (e.g., counters are set to 0), the update(x) instruction means that the value x is forwarded to the summoned algorithm, which then updates its own status (i.e. local variables). The name of an algorithm also refers to its output.

Performance of the method for bot detection according to an exemplary embodiment is evaluated by using standard performance metrics. Herein, three items having accuracy, false alarm rate, and detection time are checked: the accuracy means a ratio of well classified traces; the false alarm rate means a ratio of wrongly classified traces among those classified as bot; and the detection time means a trace length used to return decision. The detection time can be converted into actual time according to packets arrival speed.

Through experiments, individual tests as well as the global detection scheme is optimized. Accordingly, the parameters' values used for the final tests are described in the following Table I.

TABLE I

| Global scheme | | Auto Correlation | | Inter-arrival times | | Data lengths | |
|---|---|---|---|---|---|---|---|
| Parameter | Value | Parameter | Value | Parameter | Value | Parameter | Value |
| win | 100 | acn | 19 | itthr1 | 2 s | dlthr1 | 59 B |
|  |  | acv | 5 | itthr2 | 6 s | dlthr2 | 50 B |
|  |  | acthr | −0.15 | itrt1 | 1 | dlrt1 | 1 |
|  |  |  |  | itrt2 | 0.3 | dlrt2 | 7 |

Using a 100 packets long trace, i.e., detection time between 18 s and 1 min 40 s, an exemplary embodiment yields accuracy of about 86.06% and false alarm rate of about 7.74%.

According to an exemplary embodiment, through the global detection scheme using the rationales that bots send less information than human and inter-arrival times-data lengths duality, an overall accuracy can be improved 10% better than that of any other individual test.

Otherwise, it is understood that collecting data lengths at client or server side makes no difference for the obtained values. Concerning inter-arrival times, there might be some difference; however, large thresholds are used for detection (2 sec. and 6 sec.), which are not likely to be much affected by small fluctuations. So, the method according to an exemplary embodiment may be deployed at a server side.

Based on an exemplary embodiment, an integrated defense strategy system can be developed. That is, the method according to an exemplary embodiment could be used in combination with more accurate and costly tests, as a ground layer pre-selection tool.

Figure 7:
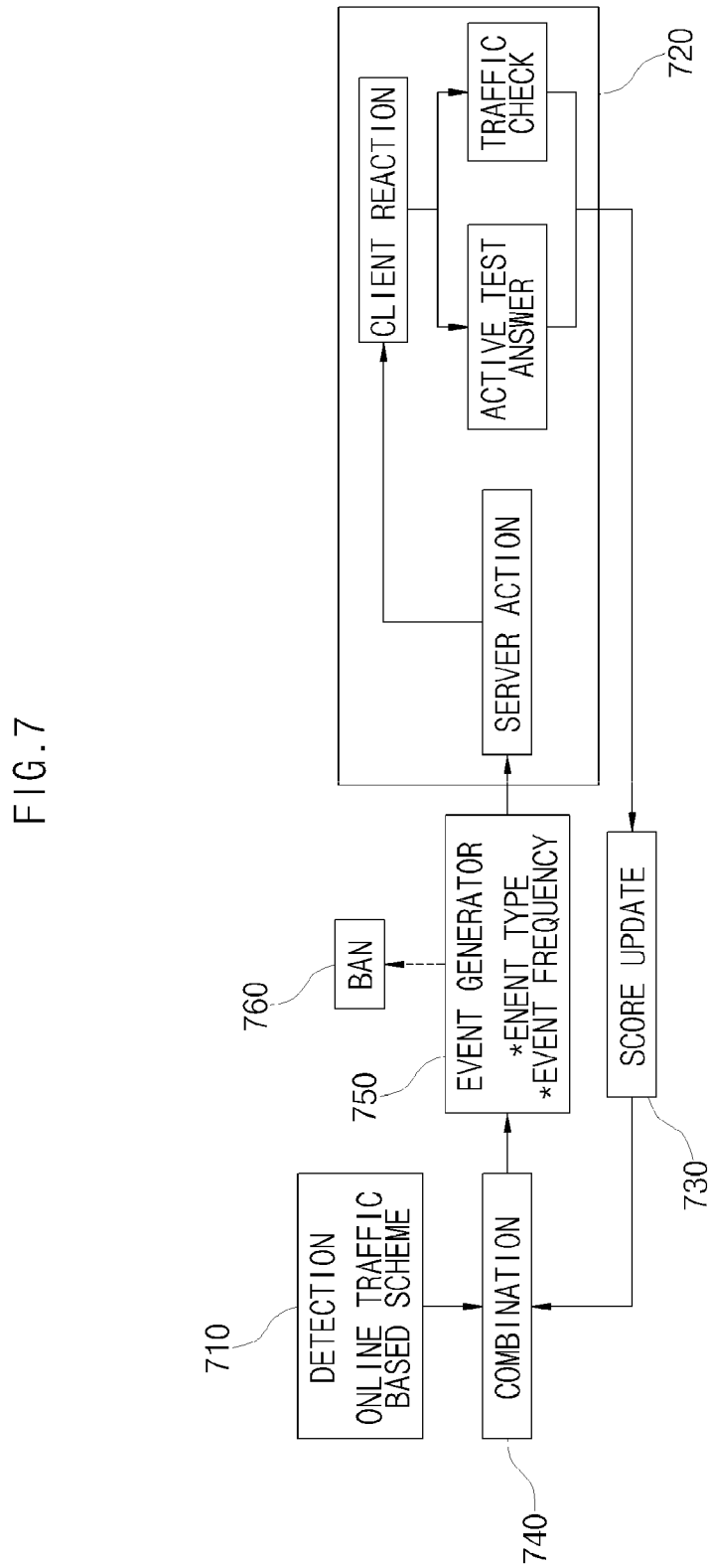
FIG. 7 is a block diagram showing an integrated defense strategy system including an online bot detection unit according to an exemplary embodiment.

FIG. 7 is a block diagram illustrating an integrated defense strategy system including an online bot detection unit according to an exemplary embodiment.

As illustrated in FIG. 7, the integrated defense strategy system according to the exemplary embodiment includes an online detection unit 710 detecting a bot by using an online detection method described above and a Turing test unit 720. In the Turing test unit 720, a test result is updated whenever a test is performed in operation 730. The test result is combined with a result of the online detection unit 710 by a combination unit 740. The combined result is delivered to an event generating unit 750. Accordingly, a control event 760 to the bot may be occurred.

As described above, in an exemplary embodiment, a method for online bot detection based on traffic pattern analysis exhibiting low time and space complexity is provided. Using the detection method, a ground layer character pre-selection may be performed. The method for bot detection according to an exemplary embodiment can be performed with high accuracy by small amounts of calculation; and thus, online real-time bot detection may be achieved. Further, if combined with other test method, the bot detection method according to an exemplary embodiment could be a component of a bigger anti-bot defense system.

The invention can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet). The computer-readable storage medium can also be distributed over network coupled computer systems so that the computer readable codes are stored and executed in a distributed fashion. Also, functional programs, codes, and code segments for accomplishing the present invention can be easily construed by programmers skilled in the art to which the present invention pertains.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for detecting a bot in a Massive Multiplayer Online Role Playing Game (MMORPG), the method comprising:
    calculating an auto correlation value on consecutive jumping windows of a user;
    comparing the auto correlation value with a first threshold to increase bot's vote by 1 when the auto correlation value is less than the first threshold; and
    determining the user as a bot when the number of bot's vote is more than a second threshold.

2. The method for detecting a bot in an MMORPG according to claim 1, wherein the second threshold is a half of all votes.

3. A method for detecting a bot in a Massive Multiplayer Online Role Playing Game (MMORPG), the method comprising:
    (a-1) calculating an auto correlation value on consecutive jumping windows of a user;
    (a-2) comparing the auto correlation value with a first threshold to increase bot's vote by 1 when the auto correlation value is less than the first threshold;
    (a-3) determining the user as a bot when the number of bot's vote is more than more than a second threshold;
    (b-1) counting the number of packets having an inter-arrival time over a third threshold (itthr1) among consecutive packets inputted from a user within a window having a first predetermined size, when the number of bot's vote is less than the second threshold;
    (b-2) counting the number of packets having the inter-arrival time over a fourth threshold (itthr2) among the consecutive packets;
    (b-3) determining the user as a human being when the number of packets having the inter-arrival time over the third threshold (itthr1) is more than a fifth threshold (itrt1), or a ratio of the number of packets having the inter-arrival time over the fourth threshold (itthr2) and the number of packets having the inter-arrival time over the third threshold (itthr1) is less than a sixth threshold (itrt2);
    (c-1) counting the number of packets having a data length over a seventh threshold (dlthr1) among consecutive packets inputted from a user within a window having a second predetermined size, when the number of packets having the inter-arrival time over the third threshold (itthr1) is less than the fifth threshold (itrt1), or a ratio of the number of packets having the inter-arrival time over the fourth threshold (itthr2) and the number of packets having the inter-arrival time over the third threshold (itthr1) is more than the sixth threshold (itrt2);
    (c-2) counting the number of packets having the data length over a eighth threshold (dlthr2) among the consecutive packets;
    (c-3) determining the user as the bot when the number of packets having the data length over the seventh threshold (dlthr1) is less than a ninth threshold (dlrt1), and the number of packets having the data length over the eighth threshold (dlthr2) is less than a tenth threshold (dlrt2); and
    (c-4) determining the user as the human being when the number of packets having the data length over the seventh threshold (dlthr1) is more than the ninth threshold (dlrt1), or the number of packets having the data length over the eighth threshold (dlthr2) is more than the tenth threshold (dlrt2)
    a half of all votes.

4. The method for detecting a bot in an MMORPG according to claim 3, wherein the second threshold is a half of all votes.

* * * * *